(12) United States Patent
Gardner et al.

(10) Patent No.: US 10,930,485 B2
(45) Date of Patent: Feb. 23, 2021

(54) ION SOURCE FOR AN ION MOBILITY SPECTROMETER

(71) Applicant: Hamilton Sundstrand Corporation, Charlotte, NC (US)

(72) Inventors: Benjamin D. Gardner, Colton, CA (US); Gary A. Eiceman, Las Cruces, NM (US); Hermann Wollnik, Santa Fe, NM (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/363,703

(22) Filed: Mar. 25, 2019

(65) Prior Publication Data
US 2020/0312646 A1 Oct. 1, 2020

(51) Int. Cl.
*H01J 49/04* (2006.01)
*G01N 27/62* (2006.01)
*G01N 27/622* (2021.01)
*H01J 49/10* (2006.01)

(52) U.S. Cl.
CPC ........ *H01J 49/0422* (2013.01); *G01N 27/622* (2013.01); *H01J 49/10* (2013.01)

(58) Field of Classification Search
CPC ........ H01J 49/00; H01J 49/02; H01J 49/0422; H01J 49/063; H01J 49/10; H01J 49/147; H01J 41/08; H01J 49/14; H01J 49/401
USPC ...................... 250/294, 379, 396 R, 397, 427
See application file for complete search history.

(56) References Cited

U.S. PATENT DOCUMENTS

| 2,945,951 | A | 7/1960 | Bright |
| 4,904,872 | A * | 2/1990 | Grix .................. H01J 27/08 250/286 |
| 6,144,029 | A | 11/2000 | Adler |
| 7,081,621 | B1 | 7/2006 | Willoughby et al. |
| 9,134,272 | B2 | 9/2015 | Denton et al. |
| 9,678,039 | B2 | 6/2017 | Sharp |
| 2001/0030285 | A1 * | 10/2001 | Miller .................. G01N 27/624 250/288 |
| 2007/0029474 | A1 * | 2/2007 | Cotter .................. H01J 49/40 250/287 |
| 2008/0179515 | A1 * | 7/2008 | Sperline .............. G01N 27/622 250/290 |
| 2011/0036977 | A1 * | 2/2011 | Denton .................. H01J 49/02 250/283 |
| 2014/0151545 | A1 | 6/2014 | Denton et al. |
| 2015/0221489 | A1 * | 8/2015 | Wollnik .............. H01J 49/0422 250/282 |

(Continued)

FOREIGN PATENT DOCUMENTS

DE 19807699 A1 9/1999

OTHER PUBLICATIONS

Partial European Search Report Issued in corresponding EP application No. 19216200.6, dated Jul. 22, 2020.

*Primary Examiner* — David A Vanore
(74) *Attorney, Agent, or Firm* — Locke Lord LLP; Scott D. Wofsy; Georgi Korobanov

(57) ABSTRACT

An ion mobility spectrometer for analyzing a vapor sample including a multi-ring ion source for receiving a vapor sample, wherein the multi-ring ion source includes a series of rings, wherein each ring of the multi-ring ion source includes an ionizing layer on an inner surface thereof, for charging at least a portion of the vapor sample and creating an ionized vapor sample.

16 Claims, 2 Drawing Sheets

(56) References Cited

U.S. PATENT DOCUMENTS

2018/0158665 A1\* 6/2018 Eiceman .............. H01J 49/0045
2020/0027713 A1\* 1/2020 Eiceman ................ G01N 27/62

\* cited by examiner

ION SOURCE FOR AN ION MOBILITY SPECTROMETER

BACKGROUND

Technological Field

The present disclosure relates to an ion mobility spectrometer, and more particularly to an ion source for an ion mobility spectrometer.

Description of Related Art

A variety of devices are known in the ion mobility spectrometer field. Specifically devices and methods are known for ionizing gas-phase molecules and driving them through an electric field to a detector. The time required for an ion to traverse the defined space between the ionization source and the detector is characteristic of the ion structure and provides information about the identity of the original molecule.

The conventional methods and systems have generally been considered satisfactory for their intended purpose. However, there is still a need in the art for an ionizing section having improved reliability and repeatability. There also remains a need in the art for such improvements and components that are economically viable. The present disclosure may provide a solution for at least one of these remaining challenges.

SUMMARY OF THE INVENTION

An ion mobility spectrometer for analyzing a vapor sample includes a multi-ring ion source for receiving a vapor sample, wherein the multi-ring ion source includes a series of rings, wherein each ring of the multi-ring ion source includes an ionizing layer on an inner surface thereof, for charging at least a portion of the vapor sample and creating an ionized vapor sample.

The ion mobility spectrometer can include an electrostatic gate for receiving a voltage pulse located downstream of the multi-ring ion source for directing the ionized vapor sample to an analyzing section of the ion mobility spectrometer. The series of rings can be electrically insulated from each other, and be approximately 2 millimeters thick. The series of rings can be arranged concentrically in-line and have an equal diameter. Each of the rings of the series of rings can include a gap between adjacent rings.

Each ring of the series of rings can include an array of passages there through. Each passage of the array of passages can include an ionizing layer. The ionizing layer can include Nickel 63, or similar. The array of passages can include a honeycomb, or checkerboard or similar pattern.

The ion mobility spectrometer can also include a reverse field ionization disk, having a diameter equal to or similar to a diameter of the series of rings, downstream of the multi-ring ion source and upstream of the electrostatic gate. The reverse field ionization disk can include an upstream facing surface including an ionization layer. The ionization layer can include Nickel coating or Nickel foil. The reverse field ionization disk can include an array of apertures configured for passing an air buffer gas there through. The ion mobility spectrometer can also be operated by using the reverse field ionization disk without the multi-ring ion source.

A method of analyzing a vapor using an ion mobility spectrometer includes passing a vapor sample to a series of ionizing rings, ionizing the vapor sample using the series of ionizing rings in order to create an ionized vapor, passing a buffer gas through an ionization disk located downstream of the series of ionization rings for buffering the ionized vapor, and passing at least a portion of the ionized vapor downstream to an analyzing section of the ion mobility spectrometer. The ionization disk can direct Beta particles away from the analyzation section.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
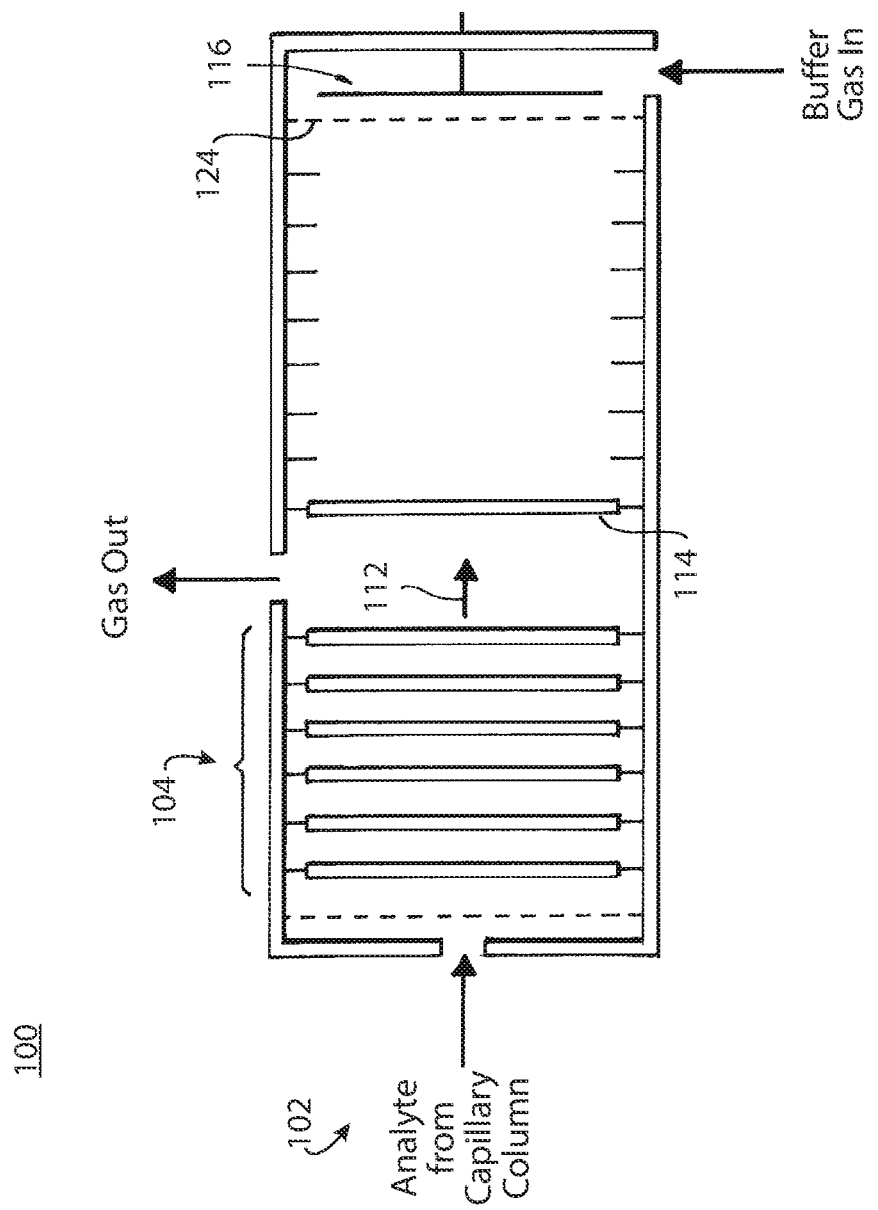
FIG. 1 is a schematic view of an ion mobility spectrometer showing a multi-ring ion source.

Reference will now be made to the drawings wherein like reference numerals identify similar structural features or aspects of the subject invention. For purposes of explanation and illustration, and not limitation, a partial view of an exemplary embodiment of an ion mobility spectrometer including a multi-ring ion source in accordance with the invention is shown in FIG. 1 and is designated generally by reference character 100. Other embodiments of a multi-ring ion source in accordance with the invention, or aspects thereof, are provided in FIGS. 2-3, as will be described. The methods and systems of the invention can be used to improve the ionization of gas samples.

Figure 2:
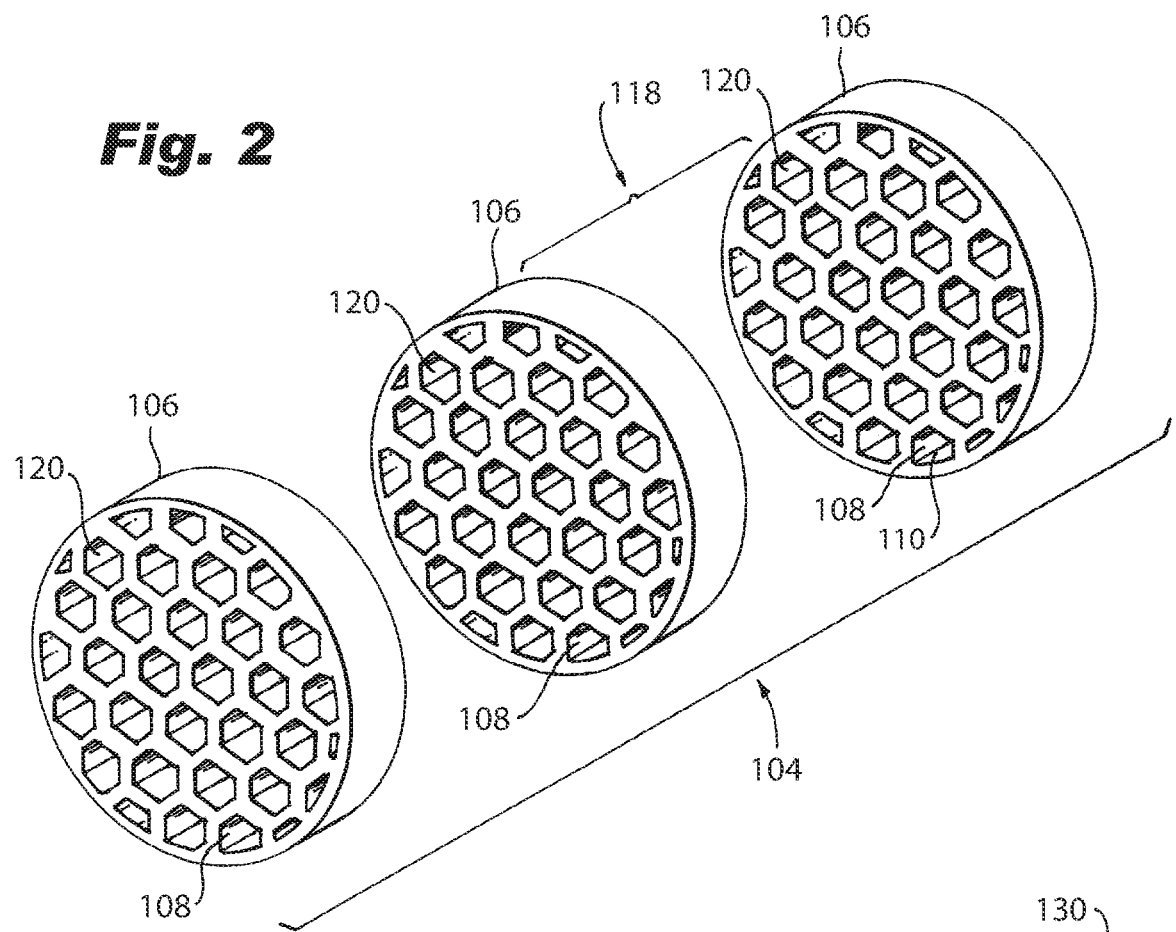
FIG. 2 is a perspective view of the ion source of FIG. 1, showing an patterned cross section.
Figure 3:
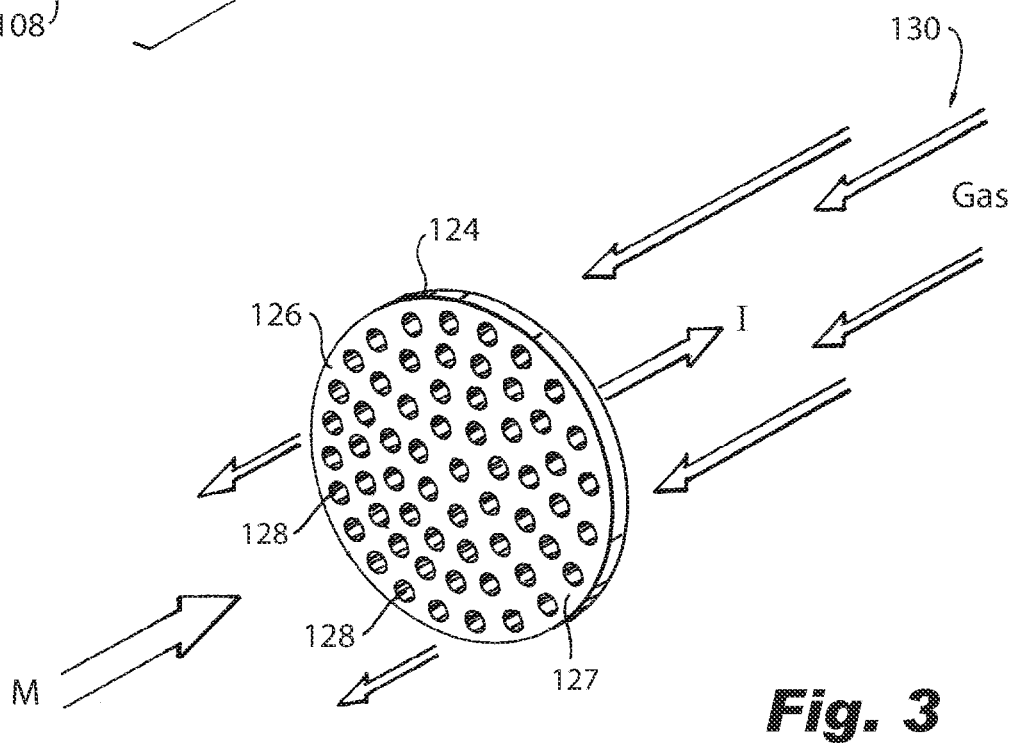
FIG. 3 is a perspective view of the reverse field portion of FIG. 1, showing a reverse field ionization disk.

Referring now to FIGS. 1-3, an ion mobility spectrometer 100 for analyzing a vapor sample 102 includes a multi-ring ion source 104 for receiving the vapor sample 102, wherein the multi-ring ion source 104 includes a series of rings 106. Each ring 106 of the multi-ring ion source 104 includes an ionization layer 108 on an inner surface 110 thereof for charging at least a portion of the vapor sample 102 and creating an ionized vapor sample 112.

The ion mobility spectrometer 100 includes an electrostatic gate 114 for receiving a voltage pulse located downstream of the multi-ring ion source 104 for directing the ionized vapor sample 112 to an analyzing section 116 of the ion mobility spectrometer 100. Once in the analyzing section 116, the ions of the ionized vapor sample 112 separate in the electric field based on their mass to charge ratio and collision cross section. The arrival time of the ion is measure at a detector, and the time of flight is used to determine ion identity.

Each ring of the series of rings 106 is electrically insulated from each other, and is approximately 2 millimeters thick. The series of rings 106 are arranged concentrically in-line and each have an equal diameter. Each of the rings 106 of the series of rings include a gap 118 between an adjacent ring 106. This arrangement improves the electric field distribution though the ionization region so that ions formed in the vapor sample 102 are less likely to be radially dispersed and more likely to reach the analyzing section 116.

Each ring 106 of the series of rings includes an array of passages 120 there through. Each passage 122 of the array of passages 120 includes an ionization layer 108. The ionization layer 108 can include Nickel 63 coating or foil, or similar. The array of passages 120 can include a honeycomb, or checkerboard or similar pattern. This pattern increases the ionization surface and improves the probability of full ionization of the vapor sample 102.

The ion mobility spectrometer 100 includes a reverse field ionization disk 124, having a diameter equal to or similar to a diameter of the series of rings 106, located downstream of the multi-ring ion source 104 and upstream of the electrostatic gate. The reverse field ionization disk 124 includes an upstream facing surface 126 including an ionization layer 127. The ionization layer 127 can be a Nickel coating or foil. The reverse field ionization disk 124 also includes an array of apertures 128 for passing an air buffer gas 130 there through. The ionizing disk 124 and the series of rings 106 can be incorporated into existing spectrometers, and replace existing ionizing sections. The ion mobility spectrometer 100 can also be operated by using the reverse field ionization disk 124 without the multi-ring ion source 104.

A method of analyzing a vapor sample 102 using an ion mobility spectrometer 100 includes passing a vapor sample 102 to a series of ionizing rings 106, ionizing the vapor sample 106 using the series of ionizing rings 106 in order to create an ionized vapor 112, passing a buffer gas 130 through an ionization disk 124 located downstream of the series of ionization rings 106, and passing at least a portion of the ionized vapor 112 to an analyzing section 116 of the ion mobility spectrometer. The ionization disk 124 directs Beta particles away from the analyzation section 116. The ionization disk 124 includes an ionization surface. This configuration helps solve an earlier challenge, wherein ionization was occurring beyond the electrostatic gate. By pointing an ionization surface in an upstream direction, beta particles are directed away from analyzing section 116.

The methods and systems of the present disclosure, as described above and shown in the drawings, provide for an analyzing spectrometer with superior properties including increased reliability and stability. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An ion mobility spectrometer for analyzing a vapor sample comprising:
a multi-ring ion source configured for receiving a vapor sample, wherein the multi-ring ion source includes a series of rings, wherein each ring of the multi-ring ion source includes a ionization layer on an inner surface thereof, configured for charging at least a portion of the vapor sample and creating an ionized vapor sample; and further comprising a reverse field ionization disk located downstream of the multi-ring ion source.

2. The ion mobility spectrometer of claim 1, further comprising an electrostatic gate for receiving a voltage pulse located downstream of the multi-ring ion source configured for directing the ionized vapor sample to an analyzing section of the ion mobility spectrometer.

3. The ion mobility spectrometer of claim 1, wherein the rings of the series of rings are electrically insulated from each other.

4. The ion mobility spectrometer of claim 1, wherein each ring of the series of rings includes an array of passages there through.

5. The ion mobility spectrometer of claim 4 wherein the array of passages includes a honeycomb pattern.

6. The ion mobility spectrometer of claim 1, wherein the series of rings is arranged concentrically in-line along an axis.

7. The ion mobility spectrometer of claim 1, wherein each of ring of the series of rings is arranged including a gap to an adjacent ring.

8. The ion mobility spectrometer of claim 1, wherein the reverse field ionization disk is located upstream of the electrostatic gate.

9. The ion mobility spectrometer of claim 1, wherein the reverse field ionization disk includes an upstream facing surface including an ionization coating.

10. The ion mobility spectrometer of claim 1, wherein the reverse field ionization disk includes an array of apertures configured for passing an air buffer gas there through.

11. The ion mobility spectrometer of claim 1, wherein the reverse field ionization disk has a diameter equal to a diameter of the series of rings.

12. The ion mobility spectrometer of claim 1, wherein each ring of the series of rings are approximately 2 mm thick.

13. An ion mobility spectrometer for analyzing a vapor sample comprising:
reverse field ionization disk located downstream configured for receiving a vapor sample located upstream of an electrostatic gate, wherein the reverse field ionization disk includes an upstream facing surface including an ionization coating.

14. The ion mobility spectrometer of claim 13, wherein the reverse field ionization disk includes an array of apertures configured for passing an air buffer gas there through.

15. A method of analyzing a vapor sample using an ion mobility spectrometer comprising:
passing a vapor sample through a capillary column to a series of ionizing rings each having;
ionizing the vapor sample with the series of ionizing rings in order to create an ionized vapor;
passing a buffer gas through an ionization disk located downstream of the series of ionization rings for buffering the ionized vapor; and
passing the ionized vapor downstream to an analyzing section of the ion mobility spectrometer.

16. The method of claim 15, wherein the ionization disk directs Beta particles away from the analyzation section.

* * * * *